United States Patent [19]

Hohmann

[11] 4,216,196

[45] Aug. 5, 1980

[54] PROCESS FOR THERMALLY DECOMPOSING CHLORIDES OF BIVALENT OR MULTIVALENT METALS

[75] Inventor: Klaus Hohmann, Hofheim-Wildsachsen, Fed. Rep. of Germany

[73] Assignee: Metallgesellschaft Aktiengesellschaft, Frankfurt am Main, Fed. Rep. of Germany

[21] Appl. No.: 922,510

[22] Filed: Jul. 6, 1978

[30] Foreign Application Priority Data

Jul. 7, 1977 [DE] Fed. Rep. of Germany ....... 2730646

[51] Int. Cl.$^2$ .......................... C01B 7/08; C01B 13/14
[52] U.S. Cl. .................................... 423/481; 423/488; 423/592; 423/633; 423/639
[58] Field of Search ................. 423/481, 488, DIG. 1, 423/592, 633, 639, 626, 605, 607; 203/12, 53

[56] References Cited

U.S. PATENT DOCUMENTS

| 1,906,467 | 5/1933 | Heath | 203/12 |
|---|---|---|---|
| 2,155,119 | 4/1939 | Ebner | 423/604 |
| 2,357,095 | 8/1944 | Evans et al. | 203/12 |
| 2,764,532 | 9/1956 | Rauh | 203/53 |
| 3,399,964 | 9/1968 | Michels et al. | 423/488 |
| 3,440,009 | 4/1969 | Flood et al. | 423/488 |
| 3,779,870 | 12/1973 | Gudmundsen et al. | 423/488 |
| 3,852,430 | 12/1974 | Lienau et al. | 423/481 |
| 4,049,788 | 9/1977 | Bierbach et al. | 423/592 |

FOREIGN PATENT DOCUMENTS

| 245901 | 3/1966 | Austria. |
|---|---|---|
| 262723 | 6/1968 | Austria. |
| 270683 | 5/1969 | Austria. |
| 1546164 | 3/1970 | Fed. Rep. of Germany. |
| 1621615 | 5/1971 | Fed. Rep. of Germany. |
| 1667180 | 6/1971 | Fed. Rep. of Germany. |
| 1667195 | 6/1971 | Fed. Rep. of Germany. |
| 1667724 | 7/1971 | Fed. Rep. of Germany. |
| 2261083 | 7/1974 | Fed. Rep. of Germany. |

OTHER PUBLICATIONS

Ullmanns, Encyklopadie der technischen Chemie, 4th Ed., Band 2, p. 511.
Chem. Ing. Technik, 24 Ja Hrg 1952/NR. 2, p. 66.

*Primary Examiner*—Edward J. Meros
*Attorney, Agent, or Firm*—Karl F. Ross

[57] ABSTRACT

Bivalent or multivalent metal chloride in aqueous solution is decomposed in the presence of oxygen to produce HCl and the corresponding metal oxide. Hydrochloric acid recovered by adiabatic absorption from the decomoposition gas is concentrated by extractive distillation in contact with concentrated metal chloride solution. The resulting solution is concentrated by heat exchange with the hot decomposition gas. At least part of the solution of high concentration is supplied to the thermal decomposition stage at a metal chloride rate corresponding to the metal chloride content of the incoming aqueous liquor.

4 Claims, 2 Drawing Figures

PROCESS FOR THERMALLY DECOMPOSING CHLORIDES OF BIVALENT OR MULTIVALENT METALS

Field of the Invention

This invention relates to a process for thermally decomposing bivalent or multivalent metals in aqueous solution to form the corresponding oxides and hydrogen chloride with simultaneous recovery of overazeotropic hydrochloric acid or hydrogen chloride.

Background of the Invention

Numerous metal chlorides can be thermally decomposed into metal oxides and hydrogen chloride. The metal chloride can be fed to a processing furnace in a solid, molten or dissolved state.

In numerous cases the thermal decomposition of the metal chloride is a step in the production of the metals from ores, ore concentrates or intermediate metallurgical products.

A special application of such thermal decomposition is the processing of spent hydrochloric acid pickling liquors, hereinafter referred to as "pickle". Among the processes for regenerating spent pickle are those in which the spent pickle, mainly solutions which have been used for pickling iron and steel, is sprayed into hot flame gases, i.e. the flame of combustion gas (U.S. Pat. No. 2,115,119; Austrian Pat. Nos. OE-PS 245,901, OE-PS 262,723 and DR-PS 270,683). Particularly successful processes use a fluidized bed which is supplied directly with the spent pickle (Open German Applications—Offenlegungsschrift-DT-OS 1,546,164, DT-OS 1,621,615 and DT-OS 1,667,180; and U.S. Pat. No. 3,440,009) or with a metal chloride crystallized from solution (Open German Applications—Offenlegungschrift-DT-OS 1,667,195 and DT-OS 2,261,083).

A disadvantage of these processes is that the hydrogen chloride formed by the decomposition is recovered in most cases only in a subazeotropic concentration or, at most, at an azeotropic concentration unless the decomposition stage is followed by a separate stage for increasing the concentration of the hydrogen chloride solution. The latter, is capital intensive and requires high energy consumption.

In the decomposition of chlorides of bivalent or multivalent metals it is known to form hydrogen chloride solutions of higher concentration by initially augmenting the chloride solution concentration by indirect heat exchange with the vapor formed in an evaporator having a submerged burner.

The operation is controlled to provide a solids concentration of 40–50%, and the condensate obtained from the vapors during the initial concentrating step is used as a liquid absorbent for the hydrogen chloride from the decomposition stage.

In addition, the sensible heat of the gases formed by decomposition may be used, if desired, in an indirect heat exchange for increasing the solution concentration (Printed German Application—Auslegeschrift DT-AS 16 67 724).

While the latter process affords advantages with respect to the production of highly concentrated hydrochloric acid, it has the significant disadvantage that the step of initially increasing the concentration of the chloride solution by evaporation with the aid of submerged burners involves at least as high an energy consumption as in the previously described processes in which the decomposition stage is followed by a separate stage for increasing the hydrochloric acid in concentration.

Object of the Invention

It is an object of the invention to provide a process which is free from the disadvantages of the known processes, particularly from the disadvantages mentioned hereinbefore, and which specifically requires only a low expenditure for equipment and relatively low energy consumption.

SUMMARY OF THE INVENTION

According to the invention, this object and others which will become apparent, hereinafter are attained by the combination of the following steps:

(a) the hydrochloric acid recovered by adiabatic absorption from the gases formed by the decomposition is increased in concentration by an extractive distillation in contact with a concentrated metal chloride solution of bivalent or multivalent metals;

(b) the metal chloride solution which results from the extractive distillation and is less concentrated than the feed solution of chlorides of bivalent or multivalent metals is increased in concentration by heat exchange with the hot gases formed by the decomposition; and (c) a solution of the chlorides of the bivalent or multivalent metal in a higher concentration, of which at least part has been in direct contact with the gases formed by the decomposition, is supplied to the thermal decomposition process at a metal chloride rate which corresponds to the metal chloride content of the incoming aqueous liquor.

In an extractive distillation of a mixture having a small boiling range or a constant boiling point owing to its azeotropic character, the equilibrium constant of the two components is increased by the addition of a substance of low volatility, which in the extractive distillation of hydrochloric acid consists of a so-called dehydrating agent.

Under certain conditions, this enables the recovery in pure form of one component of the mixture, in the present case the recovery of hydrogen chloride. (For details of extractive distillation see Ullmann: "Enzyklopädie der Techn. Chemie", 4th edition, volume II, page 511, and H. Hoppe and K. Reinike: "Chem. Techn." 28 (1976), pages 87/88)

The chlorides of bivalent or multivalent metals (which will subsequently be referred to as "metal chlorides") which are contained in the aqueous liquor may be thermally decomposed in any suitable plant.

It is particularly desirable to use a fluidized bed reactor, which is operated at temperatures of 700° to 950° C., particularly about 800° C.

The use of such reactor affords the important advantage that the resulting metal oxide is granular, wear or crumble resistant and free from dust. Moreover it has an extremely low chloride content because the residence time of several hours ensures a complete decomposition.

The process is preferably carried out under the conditions set forth in U.S. Pat. No. 4,049,788, i.e. with the turbulencing gas flowing at a velocity:

$$W_G = (0.34 \text{ to } 0.56) \rho^{0.9}$$

and with the bed having a height corresponding to a pressure drop of 1200 to 2400 mm of water (mm $H_2O$)

and to a height of at least 350 mm of the bed in the absence of the turbulencing of fluidizing gas.

In the relation:

$$W_G = (0.34 \text{ to } 0.56) \rho^{0.9}$$

$W_G$ is the velocity in meters per second of the gas which has been formed by the combustion of the fuel oil and/or fuel gas, by evaporation of any water which is supplied, and by the gas-producing chemical reaction of the metal chloride.

$\rho$ is the density of the bed solids in g/cm³ (calculated as pure solid metal oxide).

For $Fe_2O_3$ having a density of 5.25 g/cm³, for example, the turbulencing gas has a velocity of 1.5 to 2.5 m/sec.

The pressure drop in the fluidized bed equals the weight of the bed solids per unit of cross-sectional area of the fluidized bed reactor (see for example Chem. Ing. Technik 24 (1952), page 66 and is thus equal to the product of the bulk density of the bed solids and the height of the non-fluidized bed. The pressure drop can be stated in mm $H_2O$ in accordance with the relation:

$\Delta p$ (in mm $H_2O$) = height (in mm) × bulk density (in g/cm³)

The decomposition of iron chloride for example results in the formation of iron oxide which has a bulk density of about 3.5 g/cm³. For this reason the height of the fluidized bed should be controlled to correspond to a height of about 350 to 750 mm of the bed at rest.

The decomposition can also be effected in a circulating fluidized bed. While an orthodox fluidized bed constitutes a dense phase which is separated by a sudden change in density from the overlying gas space, a circulating fluidized bed involves a solids distribution or gradient without a sharp boundary between free space and a layer of the solid material.

There is thus no sudden change in density between a dense phase and an overlying dust space but the concentration of the fluidized solids in the fluidized bed reactor decreases gradually from bottom to top.

The bed material is continually discharged from the fluidized bed reactor, owing to the high gas velocity which has been selected, by entrainment with the gas and is recirculated into the fluidized bed reactor after having been separated from the gas formed by the decomposition, in order to maintain substantially constant or steady-state operating conditions.

From the cycle comprising the fluidized bed reactor, the solids collector and the recycle conduit, bed solids are withdrawn only at the rate at which the solids are formed by the decomposition of the metal chlorides which are supplied, thereby further ensuring the maintenance of a steady state.

The metal chloride solution can be supplied to the process according to the invention in various ways. If the solution has a sufficiently high concentration, all or part of it may be fed to the extractive distillation stage directly, without a prior increase in concentration. In that case, the heat exchange with the hot gases formed by the decomposition is effected after the metal chloride solution has left that stage.

Depending on the rate at which the metal chloride solution is fed to the extractive distillation stage, all of the solution from which the gaseous and vaporous components have been removed may be fed to the decomposition reactor or a partial stream of the solution may be branched off and recycled to the extractive distillation stage.

If the initial metal chloride solution does not have the desired concentration and/or is not fed at the desired rate for the extractive distillation, the concentrated metal chloride solution required for the extractive distillation is formed, in accordance with a preferred feature of the invention, by a heat exchange with the hot gases formed by the decomposition and the resulting solution is supplied to the extractive distillation stage.

While the dilute metal chloride solution which becomes available as a result of the extractive distillation can be increased in concentration in any desired manner, i.e., by a direct or indirect heat exchange with the hot gases formed by the decomposition, it is essential that at least part of the metal chloride solution fed to the thermal decomposition stage be brought into direct contact with the hot gases formed by the decomposition. The metal oxides entrained by the gases formed by the decomposition are recycled to the decomposition stage.

The treatment of the initial solution to increase its concentration by a direct heat exchange with the hot gases formed by the decomposition is preferably effected in a venturi scrubber, which enables an optimum contact between the gas and liquid.

The generally subazeotropic hydrochloric acid is recovered by adiabatic absorption in an absorption column, which is usually fed with fresh water. From that column, the hydrochloric acid is fed to the extractive distillation stage. A partial stream of hydrochloric acid can be mixed with the concentrated metal chloride solution and the resulting mixture can be fed to the distillation column. In this case, the remaining partial stream is fed to a condenser, e.g. a surface condenser, which is mounted on top of the distillation column. In this embodiment of the invention, hydrochloric acid can be recovered in any desired concentration, which will depend upon the ratio of the rates at which hydrochloric acid is fed to the distillation column and the condenser and upon the cooling of the condenser.

A special cooling-water supply need not be provided for the condenser if the hydrochloric acid fed to the condenser is adequately cooled before.

To facilitate storage, it is preferred to recover hydrochloric acid which contains about 23 to 35% by weight of hydrogen chloride.

In an extreme case, all hydrochloric acid recovered by adiabatic absorption can be fed to the distillation column. In that case, hydrogen chloride of about 100% purity can be obtained at the top of the distillation column.

In both embodiments, the energy for the distillation is supplied as vapor, e.g. as live steam directly or indirectly and in a countercurrent to the metal chloride solution or to the hydrochloric acid stream. It is preferred, however, to form the vapor by a flash evaporation of the metal chloride solution fed to the distillation column and/or of the hydrochloric acid fed to the distillation column or the condenser.

When the distillation column is followed by a condenser in the practice of the invention, it is preferred to avoid an escape of hydrogen chloride into the atmosphere by venting the condenser into the column used for the adiabatic absorption of hydrochloric acid.

The process according to the invention is particularly suitable for processing metal chloride solutions which contain magnesium, aluminum, manganese, chromium, iron, cobalt and/or nickel ions.

Special advantages afforded by the process are that an overazeotropic (superazeotropic) hydrochloric acid having any desired concentration, up to virtually pure hydrogen chloride, can be produced as one product of the decomposition process substantially without need for a supply of extraneous energy, and virtually all of the energy used to increase the hydrochloric acid concentration is supplied by the waste heat which becomes available in any case as a result of the decomposition. The liquid streams can also be controlled in a simple manner and within wide limits of the desired concentration of hydrochloric acid. There are virtually no exhaust gas and sewage problems.

Brief Description of the Drawing

The above and other objects, features and advantages of the invention will become more readily apparent from the following description and Examples, reference being made to the accompanying drawing in which.

Specific Description

Figure 1:
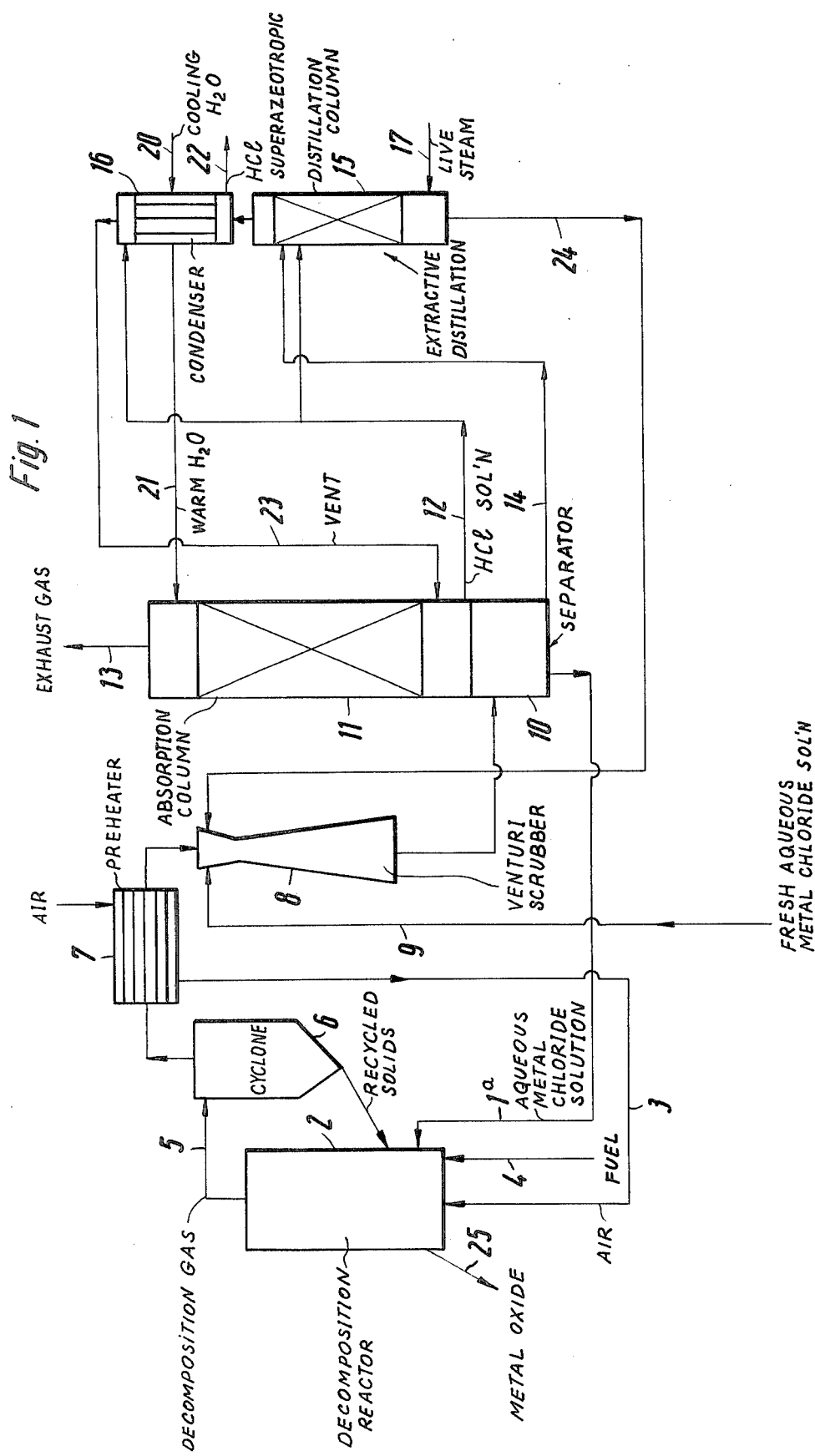
FIG. 1 is a flow diagram illustrating the invention.

The drawing shows flow schemes of the process according to the invention in which the distillation column for the extractive distillation is followed by a condenser.

A metal chloride solution which has been increased in concentration is fed by conduit 1 to and is decomposed in a decomposing reactor 2, which is fed with air via conduit 3 and with fuel via conduit 4.

The gas formed by the decomposition leaves the decomposition reactor 2 in conduit 5 and is freed from entrained dust in a cyclone separator 6.

The gas is then passed through the air preheater 7 (only in the embodiment of FIG. 1) and in the concentrating stage 8 consisting of a venturi scrubber is contacted with the fresh metal chloride solution supplied in conduit 9.

The resulting mixture of gas, water vapor and liquid is fed to a separator 10, on which a column 11 is mounted in which the hydrogen chloride contained in the gas is adiabatically absorbed to form hydrochloric acid, which is withdrawn in conduit 12. The exhaust gas is discharged through conduit 13 and a chimney.

A partial stream of the metal chloride solution which has been increased in concentration and has been separated in the separator 10 is fed in conduit 1 to the decomposition reactor, as has been mentioned hereinbefore.

The other partial stream is carried by conduit 14 and together with the hydrochloric acid from conduit 12 is fed to the extractive distillation stage. The equipment for extractive distillation consists of a distillation column 15 and a condenser 16 mounted on top of said column.

In the embodiment of the invention shown in FIG. 1, live steam is fed to the distillation column 15 by conduit 17. Metal chloride solution fed in conduit 14 and hydrochloric acid branched from conduit 12 are fed to the column 15 at its top. The remaining partial stream of acid enters the condenser 16, which is cooled by cooling water fed in conduit 20. The heated cooling water is fed in conduit 21 to the column 11 for the adiabatic absorption of hydrochloric acid.

Overazeotropic hydrochloric acid is withdrawn in conduit 22 from the lower end of the condenser 16. Conduit 23 serves to vent to condenser 16 into the column 11.

A solution which is less concentrated than the initial metal chloride solution becomes available in the lower portion of the distillation column 15 and is recycled in conduit 24 to the venturi scrubber 8.

The metal oxide formed in the decomposition stage is discharged in conduit 25.

Figure 2:
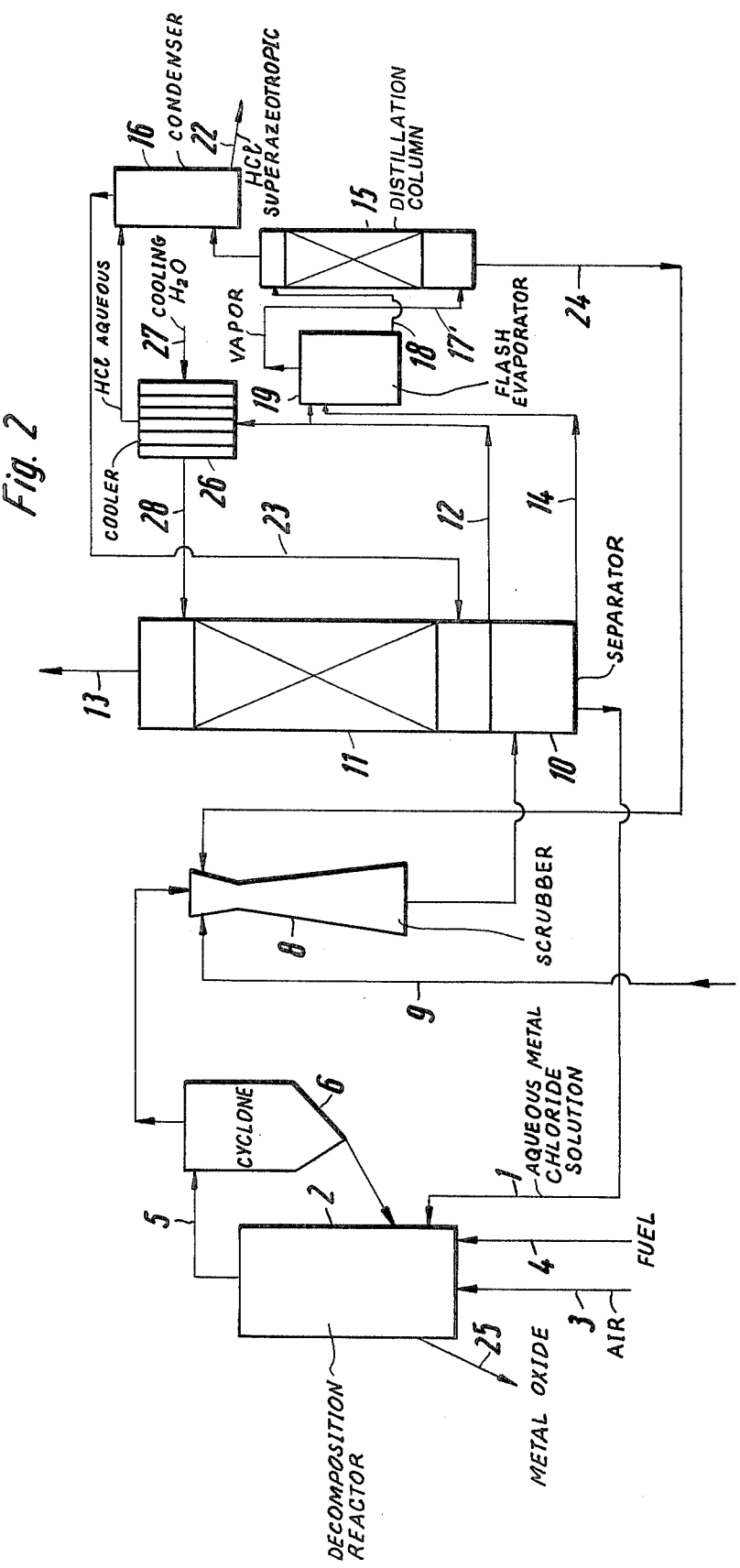
FIG. 2 is a flow diagram of another embodiment of the invention.

In the embodiment of the process shown in FIG. 2 the vapor is supplied by a preceding flash evaporator 19 to line 17'. In the evaporator the metal chloride solution fed in conduit 14 and a partial stream of hydrochloric acid branched from conduit 12 are mixed. The mixture leaving the flash evaporator 19 is fed in conduit 18 to the distillation column 15. The remaining partial stream of hydrochloric acid enters the cooler 26 and is cooled therein with cooling water supplied in conduit 27. The heated cooling water is fed in conduit 28 to column 11. The hydrochloric acid leaving the cooler 26 is fed to a mixing condenser 16, which is also fed with hydrogen chloride gas from column 15 and in which overazeotropic hydrochloric acid is formed. Because a partial stream of hydrochloric acid has been cooled in the cooler 26, there is no need for a separate cooling of the condenser 16 in this case.

Just as in the embodiment of FIG. 1, the overazeotropic hydrochloric acid is discharged through conduit 22 and the exhaust gases from the condenser 16 are fed in conduit 23 to the column 11. The metal chloride solution which becomes available in the distillation column 15 is fed in conduit 24 to the venturi scrubber 8.

Specific Examples

EXAMPLE 1 (FIG. 1)

A magnesium chloride solution was processed, which became available at a rate of 5660 kg/h in a concentration of 29% by weight of $MgCl_2$ and at 25° C.

The solution was fed in conduit 9 to the venturi scrubber 8, which was also fed with gases of 630° C., which had been formed by the decomposition in the decomposition reactor 2, consisting of a fluidized bed reactor, and passed through the air preheater 7. The mixture of gas, water vapor and liquid formed in the venturi scrubber 8 was fed to the separator 10, in which a solution containing 37% $MgCl_2$ by weight became available. A partial stream of that solution was fed in conduit 1 to the decomposition reactor 2 at a rate of 5550 kg/h. The reactor 2 was also fed with air, which had been preheated to 330° C. in the air preheater 7, at a rate of 11350 kg/h, and with methane fuel at a rate of 800 standard m³/h. 695 kg magnesia per hour became available in the decomposition reactor 2 and were discharged via conduit 25. Fines entrained in conduit 5 by the hot exhaust gas of 800° C. were substantially separated from the gas in the cyclone separator 6 and were recycled to the decomposition reactor 2.

Another partial current of the magnesium chloride solution of 100° C. was fed in conduit 14 to the distillation column 15 at a rate of 32 500 kg/h and a temperature of 100° C. A partial stream of subazeotropic hydrochloric acid of 85° C., which contained 18% HCl by weight, was fed to the column 15 at a rate of 4356 kg/h. The distillation column 15 was heated with steam of 120° C., which was fed in conduit 17 at a rate of 750 kg/h. The remaining partial stream of subazeotropic hydrochloric acid was fed in conduit 12 at a rate of 3 738 kg/h to the condenser 16 mounted on top of the distillation column 15. The condenser 16 was cooled with cooling water of 10° C., which was in conduit 20 fed at a rate of 8 m³/h and in the condenser was heated to 45° C. and was subsequently fed in conduit 21 to the top of the column 11 for the adiabatic absorption of the hydrochloric acid. Overazeotropic hydrochloric acid of 90° C., which contained 28% HCl by weight, was withdrawn from the bottom of the condenser 16 at a rate of 4420 kg/h. The condenser 16 was vented into the column 11 via conduit 23.

A magnesium chloride solution of 115° C., which had a concentration of 32.7% by weight, became available in the distillation column 15 at a rate of 36 730 kg/h and was recycled in conduit 24 to the venturi scrubber 8 for another increase in concentration.

Exhaust gas which was virtually free from hydrogen chloride was drawn from the top of column 11 in conduit 13 at a rate of 21,230 kg/h.

EXAMPLE 2 (FIG. 2)

A $FeCl_3$ solution was processed, which became available at a rate of 1675 liters per hour in a concentration of 30% by weight and at 80° C. The solution was fed in conduit 9 to the venturi scrubber 8, which was also fed with exhaust gases of 800° C. from the decomposition reactor 2, which consisted of a fluidized bed reactor. The mixture of gas, water vapor and liquid which was formed in the venturi scrubber 8 was fed to the separator 10 and was separated therein into a gas phase and a liquid phase. Iron chloride at a rate corresponding to the initial feed rate of iron chloride was supplied as a solution having a concentration of 65% by weight in conduit 1 to the decomposition reactor 2, which was also fed with air of normal temperature, at a rate of 2900 kg/h, and with methane at a rate of 205 standard m³/h. The decomposition reaction was carried out at 800° C. and resulted in a formation of $Fe_2O_3$, which became available at a rate of 320 kg/h and was discharged via conduit 25. Most of the $Fe_2O_3$ entrained by the exhaust gas at 800° C. was separated in the separator 6 and recycled to the decomposition reactor. The residual iron oxide in the gas formed by the decomposition was removed from the gas in the venturi scrubber 8.

A second partial stream of a solution of 110° C., which contained 65% $FeCl_3$ by weight, was fed from the separator 10 in conduit 14 to the flash evaporator 19 at a rate of 14.4 m³/h. The flash evaporator 19 was also fed with hydrochloric acid of 85° C., which had a concentration of 19% by weight, at a rate of 19 580 kg/h. The solution supplied to the flash evaporator was cooled by about 5° C. by the flash evaporation and the resulting steam was fed in conduit 17 to the distillation column 15. The mixture of iron chloride solution and hydrochloric acid solution which became available in the flash evaporator was fed in conduit 18 to the distillation column 15.

A partial stream of hydrochloric acid of 85° C., which had a concentration of 19% by weight, remained in conduit 12 and was fed at a rate of 1740 kg/h and to the cooler 26 and was cooled in the latter to about 43° C. by means of cooling water of 15° C. which was fed via conduit 27 at a rate of 2.2 m³/h. The cooling water which had been heated in the cooler 26 was fed in conduit 28 to the column 11 for adiabatic absorption. The cooled hydrochloric acid leaving the cooler 26 and the hydrogen chloride vapors formed in the column 15 were mixed in the surface condenser 16, in which hydrochloric acid of 85° C., which contained 23.5% hydrogen chloride by weight, became available at a rate of 1875 kg/h and was discharged in conduit 22.

$FeCl_3$ solution of about 105° C., which contained about 63.8% $FeCl_3$ by weight, became available at the bottom of the distillation column 15 at a rate of 14.8 m³/h and was fed in conduit 24 to the venturi scrubber 8 for an increase in concentration.

Exhaust gas which was substantially free from hydrogen chloride was drawn by conduit 13 at a rate of about 5000 kg/h from the top of the column 11 for the adiabatic absorption.

I claim:
1. In a process for producing superazeotropic hydrochloric acid in which an incoming aqueous liquor containing bivalent or multivalent metal chloride is treated to form the corresponding metal oxide and hydrogen chloride wherein a solution of the metal chloride is thermally decomposed to produce said metal oxide and a hot gas containing hydrogen chloride, the improvement which comprises the steps of:
   (a) adiabatically absorbing hydrogen chloride from said gas to form a first hydrochloric acid solution with a subazeotropic hydrogen chloride concentration;
   (b) generating vapors of a second hydrochloric acid solution with a hydrogen chloride concentration which is greater than that of the first hydrochloric acid solution with a subazeotropic concentration of hydrogen chloride by subjecting a first part of said first hydrochloric acid solution to extractive distillation in contact with a concentrated metal chloride solution of said bivalent or multivalent metal;
   (c) cooling the remaining part of the first hydrochloric acid solution;
   (d) condensing the vapors of the second hydrochloric acid solution generated during step (b) with the cooled remaining part of the first hydrochloric acid solution to form superazeotropic hydrochloric acid;
   (e) recovering from the extractive distillation of step (b) another metal chloride solution less concentrated in the bivalent or multivalent metal chloride than the aqueous liquor supplied to the extractive distillation and increasing the concentration of the other metal chloride solution in the bivalent or multivalent metal chloride by direct heat exchange with hot gases formed by the decomposition, thereby evaporating water from said other metal chloride solution; and
   (f) supplying said other metal chloride solution, after the increase in the concentration thereof in the bivalent or multivalent chloride and after at least a portion of said other metal chloride solution has been in direct contact with the gas formed by the decomposition, to the thermal decomposition process at a metal chloride rate which corresponds to the metal chloride content of the incoming aqueous liquor.

2. The process defined in claim 1 wherein during step (b) vapor is formed by flash evaporation of the solution of bivalent or multivalent metal chloride used during the extractive distillation.

3. The process defined in claim 1 wherein during step (b) vapor is formed by flash evaporation of said first hydrochloric acid solution used during the extractive distillation.

4. The process defined in claim 1 wherein said metal chloride is a chloride of magnesium, aluminum, manganese, chromium, iron, cobalt and/or nickel.

* * * * *